(12) United States Patent
Miller (10) Patent No.: US 10,062,936 B2
(45) Date of Patent: Aug. 28, 2018

(54) FLEX TUBING FOR VEHICLE ASSEMBLIES

(71) Applicant: FORD GLOBAL TECHNOLOGIES, LLC, Dearborn, MI (US)

(72) Inventor: Daniel Miller, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 227 days.

(21) Appl. No.: 14/744,500

(22) Filed: Jun. 19, 2015

(65) Prior Publication Data
US 2016/0372803 A1 Dec. 22, 2016

(51) Int. Cl.
| | | |
|---|---|---|
| *H01M 10/60* | (2014.01) | |
| *H01M 10/613* | (2014.01) | |
| *H01M 10/625* | (2014.01) | |
| *H01M 10/6556* | (2014.01) | |
| *B60L 11/18* | (2006.01) | |
| *F16L 11/14* | (2006.01) | |
| *H01M 10/6554* | (2014.01) | |
| *B60R 13/08* | (2006.01) | |
| *F16L 11/18* | (2006.01) | |

(52) U.S. Cl.
CPC ..... *H01M 10/6556* (2015.04); *B60L 11/1879* (2013.01); *B60R 13/0846* (2013.01); *F16L 11/14* (2013.01); *F16L 11/18* (2013.01); *H01M 10/625* (2015.04); *H01M 10/6554* (2015.04); *H01M 2220/20* (2013.01)

(58) Field of Classification Search
CPC ........... H01M 10/6556; H01M 10/613; H01M 10/625; H01M 2/06; H01M 2/1083; H01M 2220/20; B60L 11/1879
See application file for complete search history.

(56) References Cited

U.S. PATENT DOCUMENTS

| | | | |
|---|---|---|---|
| 2,996,052 A * | 8/1961 | Murphy | F02M 1/00 |
| | | | 123/555 |
| 4,819,970 A | 4/1989 | Umehara | |
| 5,305,799 A | 4/1994 | Dal Palu | |
| 8,231,996 B2 | 7/2012 | Howard et al. | |
| 2006/0082072 A1* | 4/2006 | Henry | F16L 5/08 |
| | | | 277/602 |
| 2009/0023056 A1 | 1/2009 | Adams et al. | |
| 2011/0020676 A1* | 1/2011 | Kurosawa | B60K 1/04 |
| | | | 429/62 |
| 2011/0269008 A1* | 11/2011 | Houchin-Miller | ............ |
| | | | B60L 11/1874 |
| | | | 429/120 |
| 2013/0192807 A1 | 8/2013 | DeKeuster | |
| 2014/0011059 A1* | 1/2014 | Hashimoto | H01M 2/1077 |
| | | | 429/72 |
| 2014/0048230 A1 | 2/2014 | Hirsch et al. | |

(Continued)

FOREIGN PATENT DOCUMENTS

| | | | |
|---|---|---|---|
| CN | 203423237 U | 2/2014 | |
| FR | 2998098 A1 | 5/2014 | |
| WO | WO 2011019796 A1 * | 2/2011 | ........... B01D 53/326 |

*Primary Examiner* — Jonathan G Jelsma
(74) *Attorney, Agent, or Firm* — Carlson, Gaskey & Olds (57) ABSTRACT

Flex tubing for a vehicle assembly according to an exemplary aspect of the present disclosure includes, among other things, a tube body made of a metallic material, the tube body including a first rigid segment, a second rigid segment and a flexible segment extending between the first rigid segment and the second rigid segment.

13 Claims, 5 Drawing Sheets

(56) References Cited

U.S. PATENT DOCUMENTS

2014/0322582 A1 10/2014 Ruter et al.
2015/0140366 A1* 5/2015 Nicholls ........... H01M 10/5016
　　　　　　　　　　　　　　　　　429/50

* cited by examiner

FLEX TUBING FOR VEHICLE ASSEMBLIES

TECHNICAL FIELD

This disclosure relates generally to a vehicle assembly. The vehicle assembly includes flex tubing for fluidly connecting components of the vehicle assembly. The flex tubing is configured to adjust to tolerance variations between the respective mounting locations of rigid end segments of the flex tubing.

BACKGROUND

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on the internal combustion engine to propel the vehicle.

Vehicles typically employ numerous vehicle assemblies for housing various components. One example of such an assembly is the battery assembly. Battery assemblies include a plurality of battery cells that are utilized to power electric machines and other electric loads of an electrified vehicle. It is often necessary to fluidly connect components of the battery assembly and to seal areas of the battery assembly at locations where tubing passes through an enclosure or encasement of the assembly.

SUMMARY

Flex tubing for a vehicle assembly according to an exemplary aspect of the present disclosure includes, among other things, a tube body made of a metallic material, the tube body including a first rigid segment, a second rigid segment and a flexible segment extending between the first rigid segment and the second rigid segment.

In a further non-limiting embodiment of the foregoing flex tubing, the metallic material includes aluminum.

In a further non-limiting embodiment of either of the foregoing flex tubing, the first rigid segment and the second rigid segment are disposed at opposing ends of the tube body.

In a further non-limiting embodiment of any of the foregoing flex tubing, the flexible segment includes a plurality of corrugations or ribs configured to move to adjust to a position of the first rigid segment and the second rigid segment.

In a further non-limiting embodiment of any of the foregoing flex tubing, the tube body includes a conduit for communicating a fluid through the tube body.

In a further non-limiting embodiment of any of the foregoing flex tubing, the tube body includes a single-piece, unitary construction having no mechanical attachments, joints or connections.

In a further non-limiting embodiment of any of the foregoing flex tubing, the flexible segment is configured to adjust to tolerance variations between rigid mounting locations of the first rigid segment and the second rigid segment.

A vehicle assembly according to another exemplary aspect of the present disclosure includes, among other things, an enclosure, a first component positioned at a first mounting location relative to the enclosure, a second component positioned at a second mounting location relative to the enclosure. Flex tubing extends along a non-linear path between the first component and the second component. The flex tubing is made of a metallic material.

In a further non-limiting embodiment of the foregoing vehicle assembly, the flex tubing extends to a location exterior of the enclosure.

In a further non-limiting embodiment of either of the foregoing vehicle assemblies, the flex tubing includes a first rigid segment, a second rigid segment and a flexible segment extending between the first rigid segment and the second rigid segment.

In a further non-limiting embodiment of any of the foregoing vehicle assemblies, the flex tubing includes a single-piece, unitary tube body having no mechanical attachments, joints or connections.

In a further non-limiting embodiment of any of the foregoing vehicle assemblies, the flexible segment is configured to adjust to tolerance variations between rigid mounting locations of the first rigid segment and the second rigid segment.

In a further non-limiting embodiment of any of the foregoing vehicle assemblies, at least one of the first rigid segment and the second rigid segment is received within a recess between a first plate piece and a second plate piece of the first component.

In a further non-limiting embodiment of any of the foregoing vehicle assemblies, the first mounting location and the second mounting location are offset from one another in at least one of an X-axis, a Y-axis and a Z-axis.

In a further non-limiting embodiment of any of the foregoing vehicle assemblies, the first mounting location and the second mounting location are offset from one another in at least two of an X-axis, a Y-axis and a Z-axis.

In a further non-limiting embodiment of any of the foregoing vehicle assemblies, the first component is a cold plate and the second component is a thermal management component.

In a further non-limiting embodiment of any of the foregoing vehicle assemblies, the flex tubing extends through a wall of the enclosure.

In a further non-limiting embodiment of any of the foregoing vehicle assemblies, a sealing system is configured to seal around a portion of the flex tubing that protrudes through the wall.

A vehicle assembly according to another exemplary aspect of the present disclosure includes, among other things, a battery array, an enclosure that houses the battery array, a cold plate in contact with the battery array, a sealing system mounted to a wall of the enclosure and flex tubing extending from the cold plate through the sealing system to a position outside of the enclosure.

In a further non-limiting embodiment of the foregoing vehicle assembly, the flex tubing includes a tube body embodying a single-piece, unitary construction having no mechanical attachments, joints or connections.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details a vehicle assembly that may be employed for use within a vehicle. The vehicle assembly includes flex tubing for communicating a fluid, such as coolant, between components of the vehicle assembly. The flex tubing may include a unitary metallic body having a first rigid segment, a second rigid segment and a flexible segment extending between the first and second rigid segments. The flex tubing is configured to adjust, such as by moving or bending, to tolerance variations between the components it fluidly connects. In some embodiments, the vehicle assembly is a battery assembly of an electrified vehicle. These and other features are discussed in greater detail in the following paragraphs of this detailed description.

Figure 1:
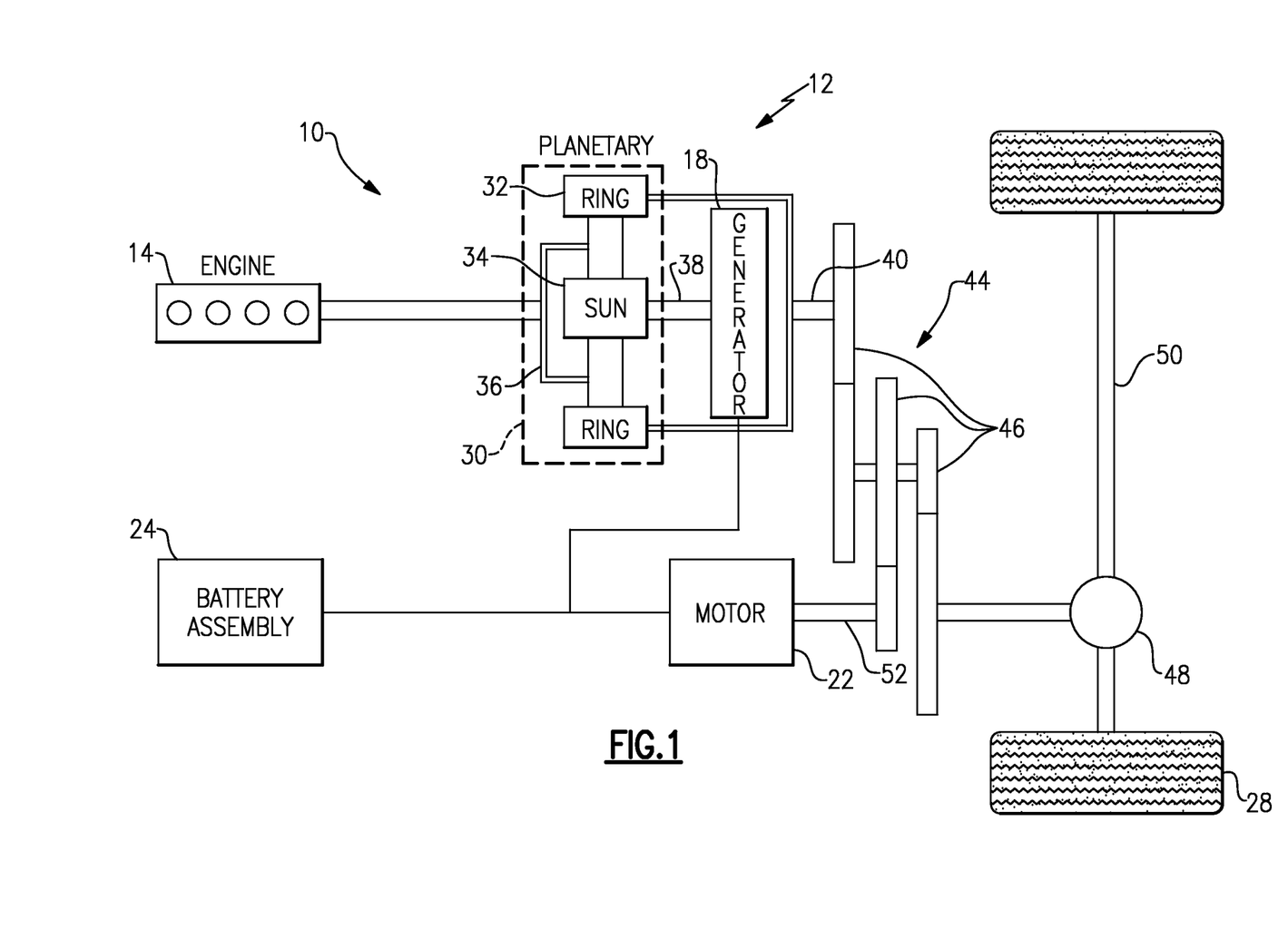
FIG. 1 schematically illustrates a powertrain of a vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's) and battery electric vehicles (BEV's). Conventional motor vehicles could also benefit from the teachings of this disclosure.

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an example type of electrified vehicle battery. The battery assembly 24 may include a high voltage traction battery pack that includes one or more battery arrays, or groupings of battery cells, capable of outputting electrical power to operate the motor 22, the generator 18, or any other electrical loads. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2:
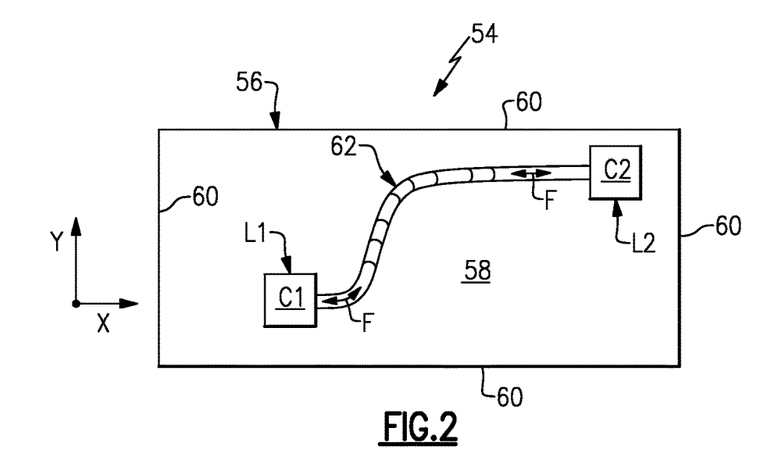
FIG. 2 illustrates a vehicle assembly according to a first embodiment of this disclosure.

FIG. 2 illustrates a vehicle assembly 54 that can be employed for use within a vehicle. For example, the vehicle assembly 54 could be employed within the electrified vehicle 12 of FIG. 1 or could alternatively be employed within a conventional motor vehicle. The vehicle assembly 54 could be any assembly that requires a fluid connection between two or more components for managing heat generated by the vehicle assembly 54. In one non-limiting embodiment, the vehicle assembly 54 is a high voltage traction battery assembly for an electrified vehicle (see, for example, the embodiment of FIGS. 6-8).

The vehicle assembly 54 includes an enclosure 56 that defines an interior 58 for housing one or more vehicle components. In one non-limiting embodiment, two components C1, C2 are housed in the interior 58. The enclosure 56 includes a plurality of walls 60 that establish the interior 58. The enclosure 56 may encompass any size, shape or configuration. That is, the enclosure 56 is not limited to the specific configurations shown in the Figures accompanying this disclosure.

Flex tubing 62 may extend between the components C1, C2. The flex tubing 62 may communicate a fluid F between the components C1, C2. In one non-limiting embodiment, the fluid F is a coolant. Although only a single fluid conduit is shown in this embodiment, multiple pieces of flex tubing 62 could extend between the components C1, C2. For example, in one non-limiting embodiment, the flex tubing 62 could include an inlet tube and a separate outlet tube.

Portions of the flex tubing 62 may flex to adjust for tolerance variations that can exist between a mounting location L1 of the first component C1 and a mounting location L2 of the second component C2. For example, the mounting location L2 may be offset from the mounting location L1 along one or more of the X, Y and Z axes (see, e.g., FIGS. 2-4). In one non-limiting embodiment, the mounting location L2 is offset from the mounting location L1 in at least the X and Y axes (see FIG. 2). In another embodiment, the mounting location L2 is offset from the mounting location L1 in at least the Z axis (see FIG. 3). In yet another embodiment, the flex tubing 62 may connect between a first component C1 housed inside the enclosure 56 and a second component C2 located exterior from the enclosure 56 to communicate fluids between the interior 58 and the exterior of the vehicle assembly 54 (see FIG. 4). The mounting location L2 may be offset from the mounting location L1 in one or more of the X, Y and Z axes.

Assembly tolerance variations (i.e., tolerance stack-up issues) between the rigid mounting locations L1, L2 can create difficulties in providing a robust fluid connection between the first component C1 and the second component C2. The flex tubing 62 of this disclosure addresses such tolerance issues by moving and adjusting to various size, location and mounting configurations within the vehicle assembly 54.

Figure 3:
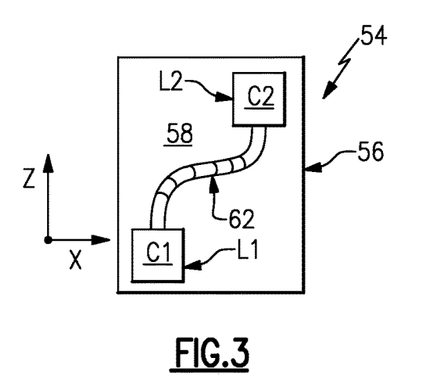
FIG. 3 illustrates a vehicle assembly according to another embodiment of this disclosure.
Figure 4:
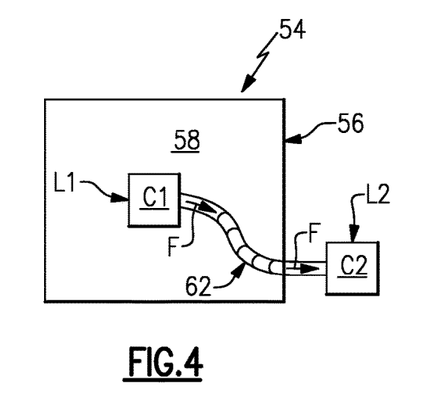
FIG. 4 illustrates a vehicle assembly according to a yet another embodiment of this disclosure.
Figure 5:
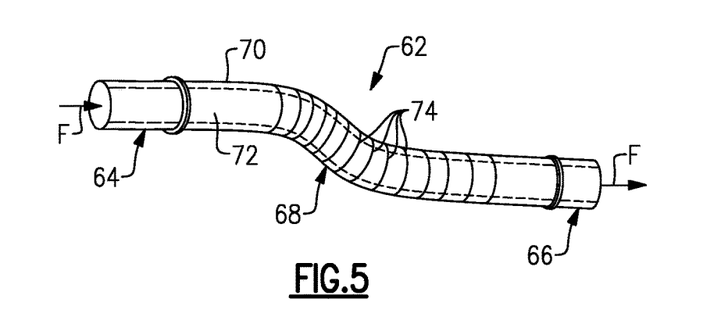
FIG. 5 illustrates flex tubing of a vehicle assembly.

FIG. 5, with continued reference to FIGS. 2-4, further illustrates the flex tubing 62. The exemplary flex tubing 62 may include a first rigid segment 64, a second rigid segment 66, and a flexible segment 68 connecting between the first rigid segment 64 and the second rigid segment 66. In one non-limiting embodiment, the first and second rigid segments 64, 66 are rigid ends of the flex tubing 62 that connect at fixed locations of either the first component C1 or the second component C2. The flexible segment 68 may adjust to various differences between the fixed mounting locations of the first and second rigid segments 64, 66. The flexible segment 68 may adjust to these differences by moving, bending, expanding, contracting, etc. In one non-limiting embodiment, the flexible segment 68 includes multiple features 74 that facilitate a necessary adjustment between the rigid mounting locations of the first and second rigid segments 64, 66. The features 74 may include a plurality of corrugations or ribs formed in the flexible segment 68.

Together, the first rigid segment 64, the second rigid segment 66 and the flexible segment 68 establish a single-piece, unitary tube body 70 that is free of any joints, connections or mechanical attachments. The tube body 70 includes a conduit 72 for communicating the fluid F between the components C1, C2. In one non-limiting embodiment, the tube body 70 is made of a metallic material. Aluminum is one non-limiting example of a suitable metallic material; however, other metallic materials are also contemplated within the scope of this disclosure.

Figure 6:
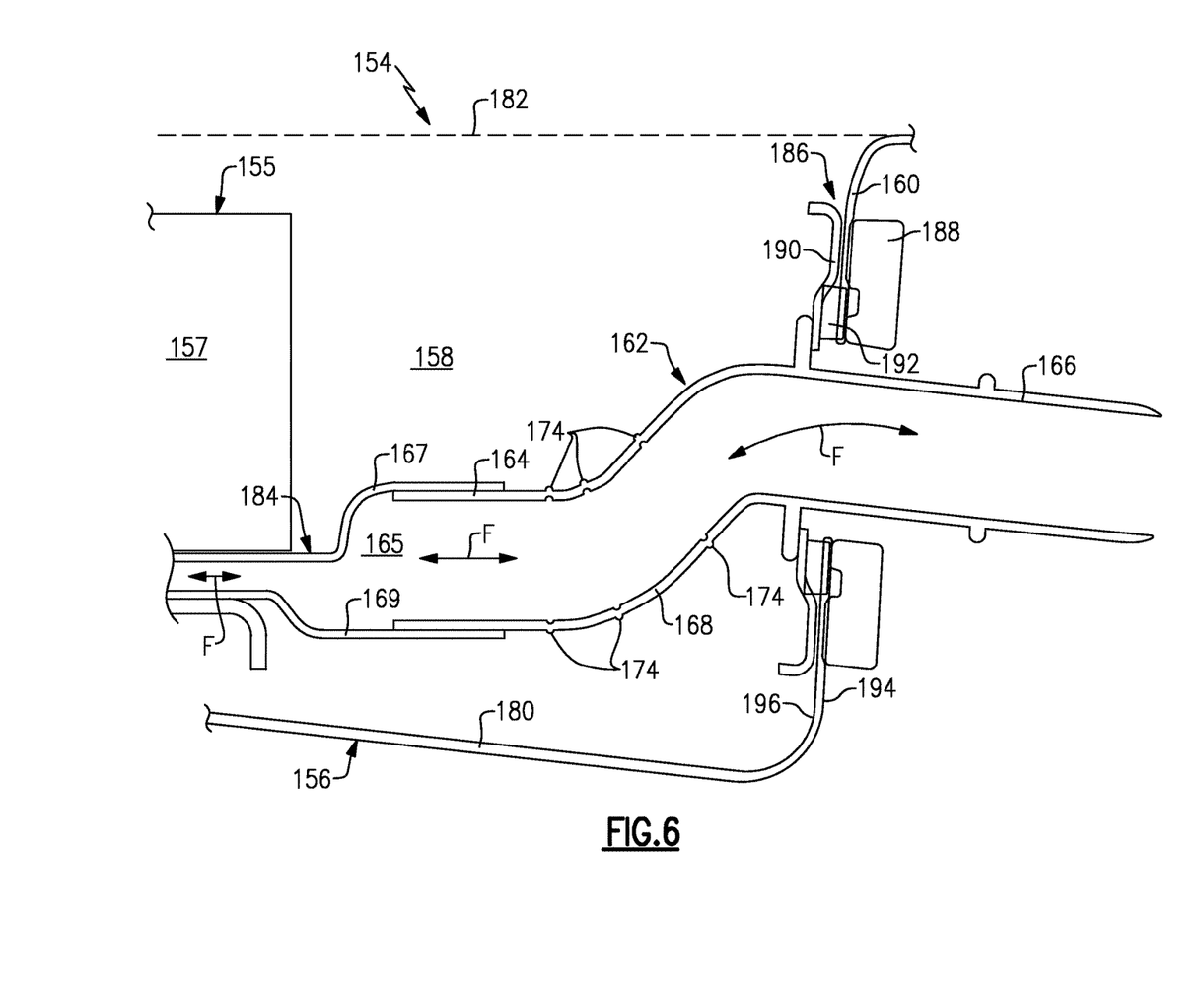
FIG. 6 illustrates a battery assembly.
Figure 7:
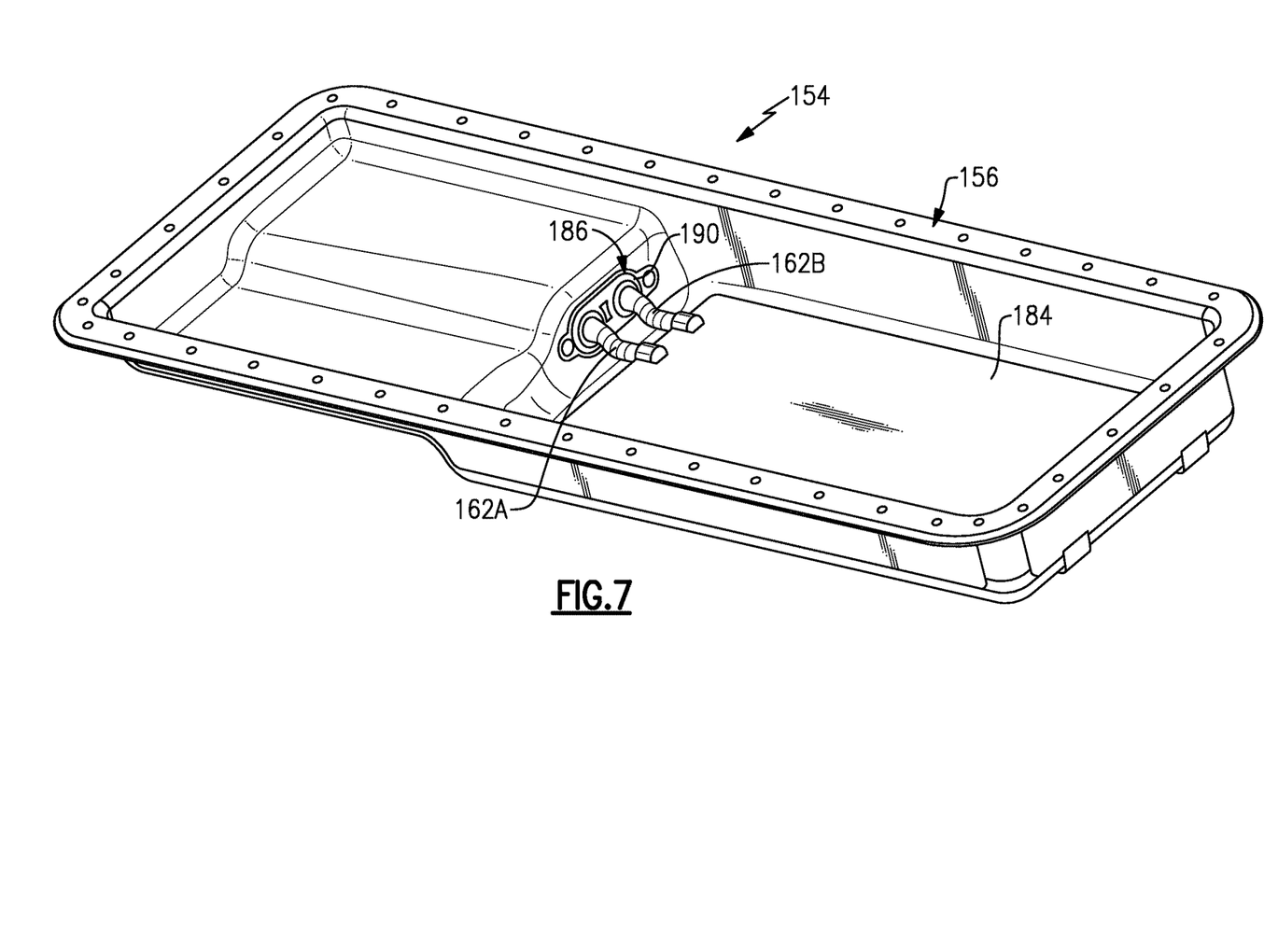
FIG. 7 illustrates an inside view of a battery assembly.
Figure 8:
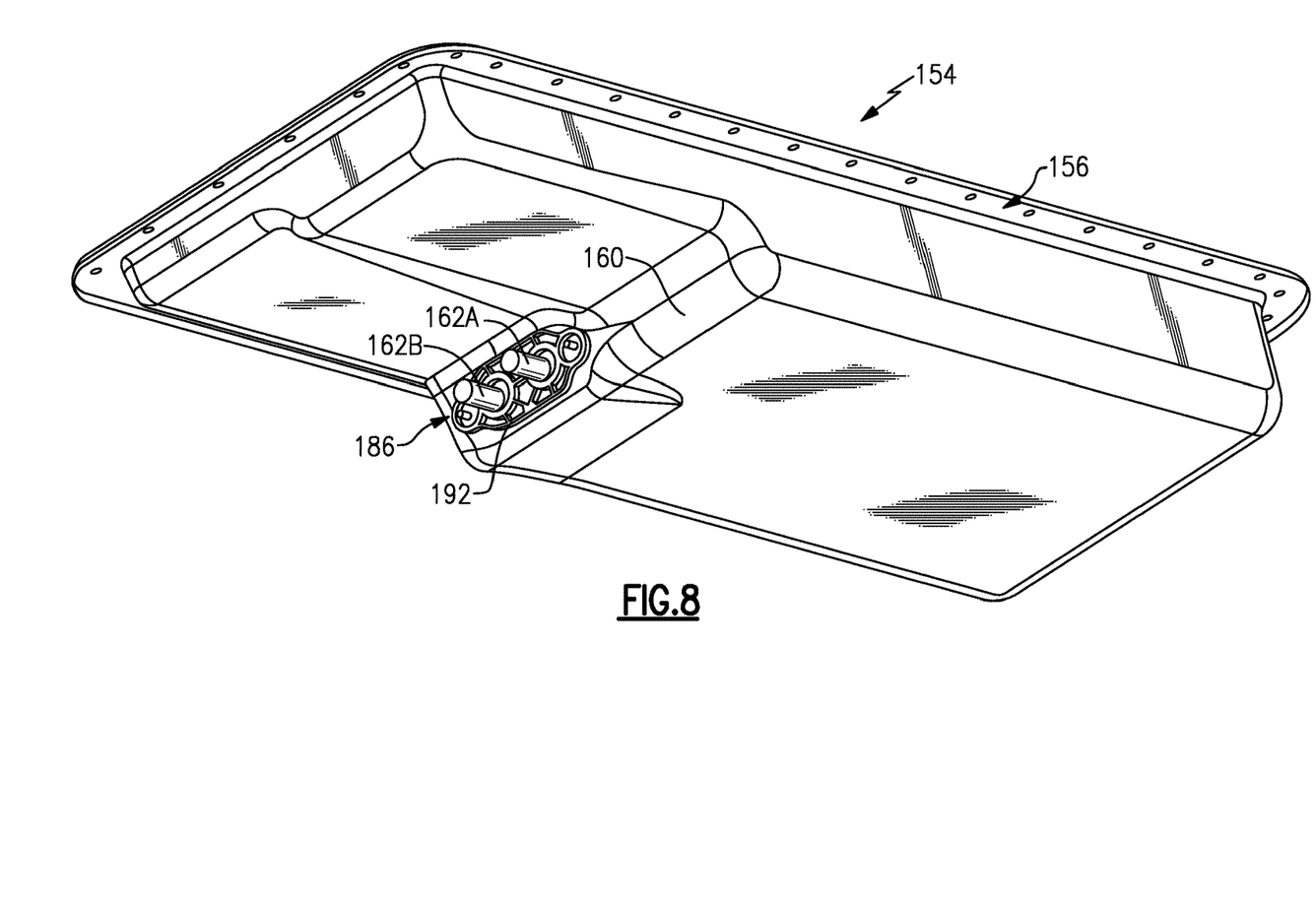
FIG. 8 illustrates an outside view of the battery assembly of FIG. 7.

FIGS. 6, 7 and 8 illustrate portions of an exemplary battery assembly 154 for use in an electrified vehicle. The battery assembly 154 is but one non-limiting example of a vehicle assembly that could benefit from the teachings of this disclosure. The exemplary battery assembly 154 includes one or more battery arrays 155, which can be described as groupings of battery cells 157, for supplying electrical power to various vehicle components. Although only a single battery array 155 is illustrated in FIG. 6, the battery assembly 154 could include multiple battery arrays within the scope of this disclosure. In other words, this disclosure is not limited to the specific configuration shown in FIGS. 6-8. The battery array 155 is removed from FIGS. 7 and 8 to better illustrate other features of the battery assembly 154.

An enclosure 156 houses the battery array 155. The enclosure 156 defines an interior 158 for housing the battery array 155 and, potentially, other components of the battery assembly 154. In one non-limiting embodiment, the enclosure 156 includes a tray 180 and a cover 182 (shown in dashed lines in FIG. 6, not shown in FIGS. 7 and 8) that establish a plurality of walls 160 that circumscribe the interior 158.

Heat may be generated by the battery cells 157 of the battery array 155 during charging operations, discharging operations or other conditions. Heat may also be transferred into the battery cells 157 during vehicle key-off conditions as a result of relatively hot ambient conditions. During other conditions, such as relatively cold ambient conditions, the battery cells 157 may need heated. A cold plate 184 may therefore be utilized as part of a thermal management system for thermally conditioning (i.e., heating or cooling) the battery cells 157.

In one non-limiting embodiment, each battery array 155 of the battery assembly 154 is positioned atop the cold plate 184 so that the cold plate 184 is in contact with the bottom surface of each battery cell 157. A fluid F may be circulated through the cold plate 184 to either add or remove heat to/from the battery assembly 154. Flex tubing 162 provides a conduit for communicating the fluid F into and out of the cold plate 184. In one non-limiting embodiment, the flex tubing 162 includes an inlet tube 162A for communicating the fluid F into the cold plate 184 and an outlet tube 162B for expelling the fluid F from the cold plate 184 (best illustrated in FIGS. 7 and 8).

In another non-limiting embodiment, the flex tubing 162 protrudes through one of the walls 160 of the enclosure 156 for connection to other thermal management components, such as a fluid pump, a chiller, a radiator, etc., that may be located outside of the interior 158. The flex tubing 162 may extend away from an edge of the cold plate 184 and extends along a non-linear path to a location outside of the enclosure 156. The flex tubing 162 may extend through one of the walls 160, which in this example is a side wall of the enclosure 156.

In another non-limiting embodiment, the flex tubing 162 includes a first rigid segment 164, a second rigid segment 166, and a flexible segment 168 connecting between the first rigid segment 164 and the second rigid segment 166. The first rigid segment 164 may be received within a recess 165 (defined between a top plate piece 167 and a bottom plate piece 169 of the cold plate 184) and the second rigid segment 166 may be connected to another component of a thermal management system, such as via a quick-connect attachment (not shown). The flexible segment 168 may adjust to various tolerance variations between the fixed mounting locations of the first and second rigid segments 164, 166. The flexible segment 168 may adjust to accommodate such tolerance differences by moving, bending, expanding, contracting, etc. In one non-limiting embodiment, the flexible segment 168 includes multiple corrugations (or ribs) 174 that can adjust to the assembly tolerance variations between the rigid mounting locations of the first and second rigid segments 164, 166.

The battery assembly 154 may additionally include a sealing system 186 that seals around the flex tubing 162 at locations where the flex tubing 162 protrudes through the wall 160. The sealing system 186 may include an exterior plate 188, an interior plate 190, and one or more seals 192. The exterior plate 188 is secured at an exterior surface 194 of the wall 160 and the interior plate 190 is secured at an interior surface 196 of the wall 160. The seal 192 may be positioned between the exterior plate 188 and the interior plate 190.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle assembly, comprising:
    a battery array;
    an enclosure that houses said battery array;
    a cold plate in contact with said battery array;
    a sealing system mounted to a wall of said enclosure, wherein said sealing system includes an exterior plate positioned at an exterior surface of said wall, an interior plate positioned at an interior surface of said wall, and a seal between said interior plate and said exterior plate; and
    flex tubing extending from said cold plate through said wall of said enclosure and through said sealing system to a position outside of said enclosure;
    wherein a first rigid segment of said flex tubing is received within a recess between a top plate piece and a bottom plate piece of said cold plate.

2. The vehicle assembly as recited in claim 1, wherein said flex tubing includes a tube body embodying a single-piece, unitary construction having no mechanical attachments, joints or connections.

3. The vehicle assembly as recited in claim 1, wherein said flex tubing is made of aluminum.

4. The vehicle assembly as recited in claim 1, wherein said enclosure includes a tray and a cover, and said wall is part of said tray.

5. The vehicle assembly as recited in claim 1, wherein a second rigid segment of said flex tubing is connected to a quick connect attachment of a thermal management system.

6. The vehicle assembly as recited in claim 1, wherein said exterior plate and said interior plate are shaped differently.

7. The vehicle assembly as recited in claim 1, wherein said top plate piece and said bottom plate piece flare outwardly from one another to establish said recess.

8. The vehicle assembly as recited in claim 1, wherein said first rigid segment extends only partially into said cold plate.

9. The vehicle assembly as recited in claim 1, wherein a portion of said flex tubing that extends through said wall excludes ribs.

10. The vehicle assembly as recited in claim 1, wherein said flex tubing includes the first rigid segment, a second rigid segment and a flexible segment extending between said first rigid segment and said second rigid segment.

11. The vehicle assembly as recited in claim 10, wherein said flex tubing includes a single-piece, unitary tube body having no mechanical attachments, joints or connections.

12. The vehicle assembly as recited in claim 10, wherein said flexible segment is configured to adjust to tolerance variations between rigid mounting locations of said first rigid segment and said second rigid segment.

13. The vehicle assembly as recited in claim 10, wherein at least one of said first rigid segment and said second rigid segment is received within a recess between a first plate piece and a second plate piece of said first component.

* * * * *